US012647388B2

(12) United States Patent
Jain et al.

(10) Patent No.: US 12,647,388 B2
(45) Date of Patent: Jun. 2, 2026

(54) ANYCAST ADDRESSING AND POLICY-BASED FORWARDING CONFIGURATION FOR MULTI-ACCOUNT CONFIGURATIONS OF A TENANT

(71) Applicant: Palo Alto Networks, Inc., Santa Clara, CA (US)

(72) Inventors: Jayant Jain, Cupertino, CA (US); Mingfei Peng, Pleasanton, CA (US); Brian Russell Kean, Cincinnati, OH (US); Srivatsan Rajagopal, Cupertino, CA (US); Uttam Ramesh, Sunnyvale, CA (US); Ketan Gunawant Kulkarni, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 234 days.

(21) Appl. No.: 18/638,425

(22) Filed: Apr. 17, 2024

(65) Prior Publication Data

US 2025/0330442 A1     Oct. 23, 2025

(51) Int. Cl.
H04L 61/5014 (2022.01)
H04L 45/16 (2022.01)
(Continued)

(52) U.S. Cl.
CPC .......... H04L 61/5014 (2022.05); H04L 45/16 (2013.01); H04L 45/74 (2013.01); H04L 61/5061 (2022.05); H04L 61/5069 (2022.05)

(58) Field of Classification Search
CPC ..... H04L 61/5014; H04L 45/16; H04L 45/74; H04L 61/5061; H04L 61/5069
See application file for complete search history.

(56) References Cited

U.S. PATENT DOCUMENTS 10,412,156 B1 *  9/2019  Dickinson ........... H04L 67/1021
10,979,387 B2 *  4/2021  Maslak ............... H04L 61/5069
(Continued)

OTHER PUBLICATIONS

Palo Alto Networks, Inc., "Create a Policy-Based Forwarding Rule", [online], [retrieved on Apr. 9, 2024] Retrieved from the Internet: <https://docs. paloaltonetworks.com/pan-os/9-1/pan-os-admin/policy/policy-based-forwarding/create-a-policy-based-forwarding-rule>, Feb. 21, 2024.

*Primary Examiner* — El Hadji M Sall
(74) *Attorney, Agent, or Firm* — Gilliam IP PLLC

(57) ABSTRACT

Anycast IP addressing and policy-based forwarding are implemented so that resources deployed in association with different accounts of a tenant but have overlapping IP addresses appear distinct to the tenant. A service that executes on a network controller configures a DHCP address pool for an account for which associated resources are indicated for deployment. The service also orchestrates instantiation of one or more connectors configured to front the resource(s) and allocates an anycast IP address to the connector(s) that is unique with respect to other connectors that front resources associated with the same account or different accounts. The service then creates a policy-based forwarding rule to forward network traffic originating from an IP address within the account's DHCP address pool and with a destination address that matches the resource(s) IP address to the anycast IP address allocated to the connector(s) that fronts the resources.

20 Claims, 4 Drawing Sheets

(51) Int. Cl.
    *H04L 45/74*          (2022.01)
    *H04L 61/5061*      (2022.01)
    *H04L 61/5069*      (2022.01)

(56)                 References Cited

U.S. PATENT DOCUMENTS

| | | | |
|---|---|---|---|
| 12,425,327 B2 * | 9/2025 | Chitsaz | H04L 45/74 |
| 2022/0393969 A1 * | 12/2022 | Eadala | H04L 45/14 |
| 2023/0300210 A1 * | 9/2023 | Wang | H04L 67/146 |
| | | | 709/203 |
| 2024/0333643 A1 * | 10/2024 | Khare | H04L 45/74 |

* cited by examiner

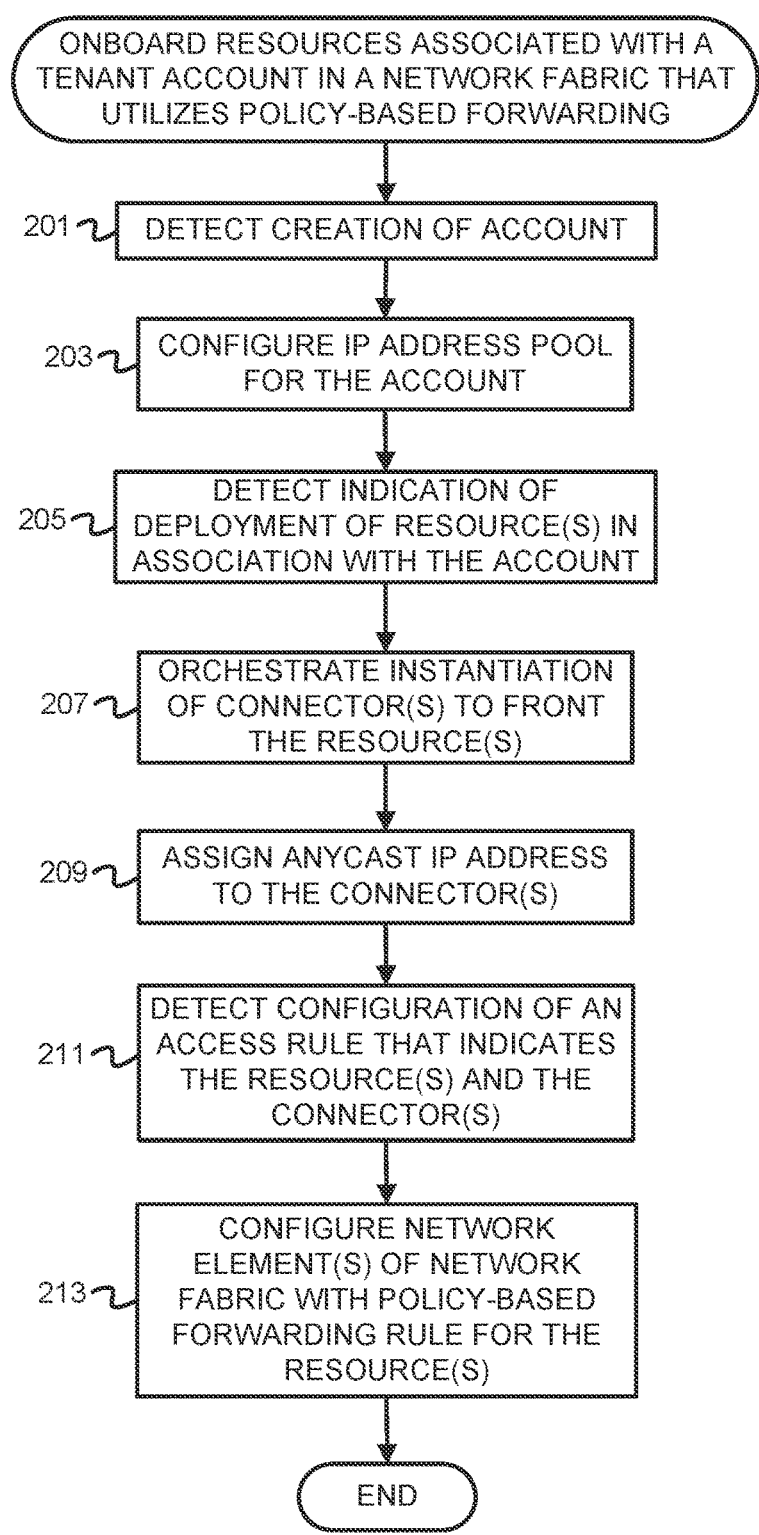

ONBOARD RESOURCES ASSOCIATED WITH A TENANT ACCOUNT IN A NETWORK FABRIC THAT UTILIZES POLICY-BASED FORWARDING

201  DETECT CREATION OF ACCOUNT

203  CONFIGURE IP ADDRESS POOL FOR THE ACCOUNT

205  DETECT INDICATION OF DEPLOYMENT OF RESOURCE(S) IN ASSOCIATION WITH THE ACCOUNT

207  ORCHESTRATE INSTANTIATION OF CONNECTOR(S) TO FRONT THE RESOURCE(S)

209  ASSIGN ANYCAST IP ADDRESS TO THE CONNECTOR(S)

211  DETECT CONFIGURATION OF AN ACCESS RULE THAT INDICATES THE RESOURCE(S) AND THE CONNECTOR(S)

213  CONFIGURE NETWORK ELEMENT(S) OF NETWORK FABRIC WITH POLICY-BASED FORWARDING RULE FOR THE RESOURCE(S)

END

FIG. 2

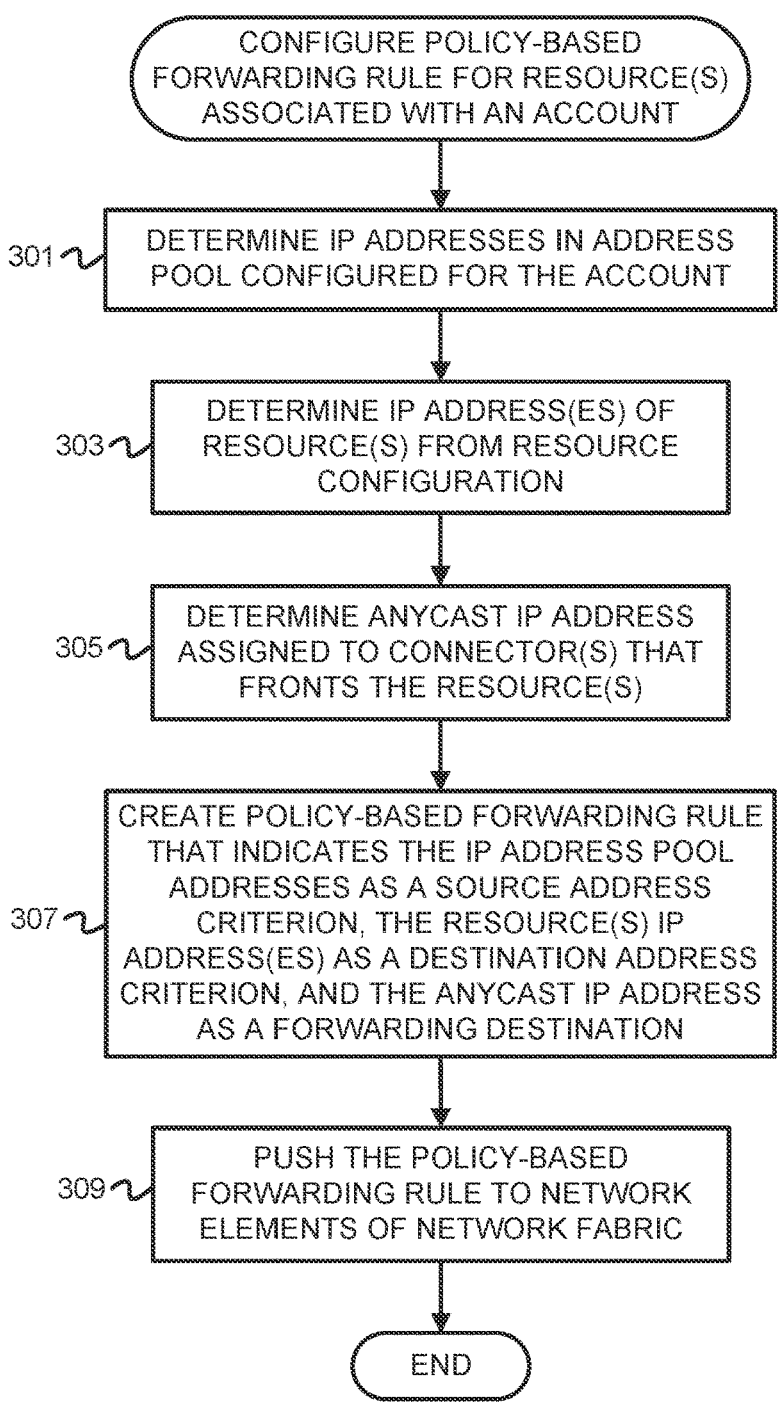

CONFIGURE POLICY-BASED FORWARDING RULE FOR RESOURCE(S) ASSOCIATED WITH AN ACCOUNT

301 DETERMINE IP ADDRESSES IN ADDRESS POOL CONFIGURED FOR THE ACCOUNT

303 DETERMINE IP ADDRESS(ES) OF RESOURCE(S) FROM RESOURCE CONFIGURATION

305 DETERMINE ANYCAST IP ADDRESS ASSIGNED TO CONNECTOR(S) THAT FRONTS THE RESOURCE(S)

307 CREATE POLICY-BASED FORWARDING RULE THAT INDICATES THE IP ADDRESS POOL ADDRESSES AS A SOURCE ADDRESS CRITERION, THE RESOURCE(S) IP ADDRESS(ES) AS A DESTINATION ADDRESS CRITERION, AND THE ANYCAST IP ADDRESS AS A FORWARDING DESTINATION

309 PUSH THE POLICY-BASED FORWARDING RULE TO NETWORK ELEMENTS OF NETWORK FABRIC

END

ANYCAST ADDRESSING AND POLICY-BASED FORWARDING CONFIGURATION FOR MULTI-ACCOUNT CONFIGURATIONS OF A TENANT

BACKGROUND

The disclosure generally relates to transmission of digital information (e.g., CPC class H04L) and network arrangements, protocols or services for addressing or naming (e.g., subclass H04L 61/00).

The anycast methodology allows for a single Internet Protocol (IP) address to be shared by multiple devices (e.g., multiple servers). An "anycast address" is an IP address that is shared by multiple devices in accordance with anycast addressing. Requests that designate an anycast address as a destination address can be served by any of the devices associated with the anycast address. With anycast routing, a sender selects which of a set of devices associated with the anycast address to send a request indicating the anycast address. Selection can be based on cost or distance such that the request is delivered to the individual device that is nearest to the sender and/or associated with the lowest cost.

Policy-based routing, also referred to as policy-based forwarding, refers to a technique for routing network traffic based on configured policies. With policy-based routing, routing decisions are made based on the policies rather than based on destination address lookups in a routing table. As an example, a policy configured for policy-based routing may dictate that network traffic should be forwarded based on its source address rather than its destination address.

Zero trust network access, commonly abbreviated as "ZTNA," refers to a security model for providing secure, remote access to resources of an organization (e.g., applications and services). ZTNA technologies differ from virtual private networks (VPNs) in their implementation of zero trust principles for providing users with access to resources, particularly in that users are denied access to resources by default. ZTNA also prevents exposure of private/internal information about an organization's resources, such as private IP addresses of applications.

BRIEF DESCRIPTION OF THE DRAWINGS

Embodiments of the disclosure may be better understood by referencing the accompanying drawings.

FIG. 2 is a flowchart of example operations for onboarding resources associated with a tenant account in a network fabric that uses anycast IP addressing and policy-based forwarding rules.

FIG. 3 is a flowchart of example operations for configuring a policy-based forwarding rule for one or more resources associated with an account.

DESCRIPTION

Figure 1:
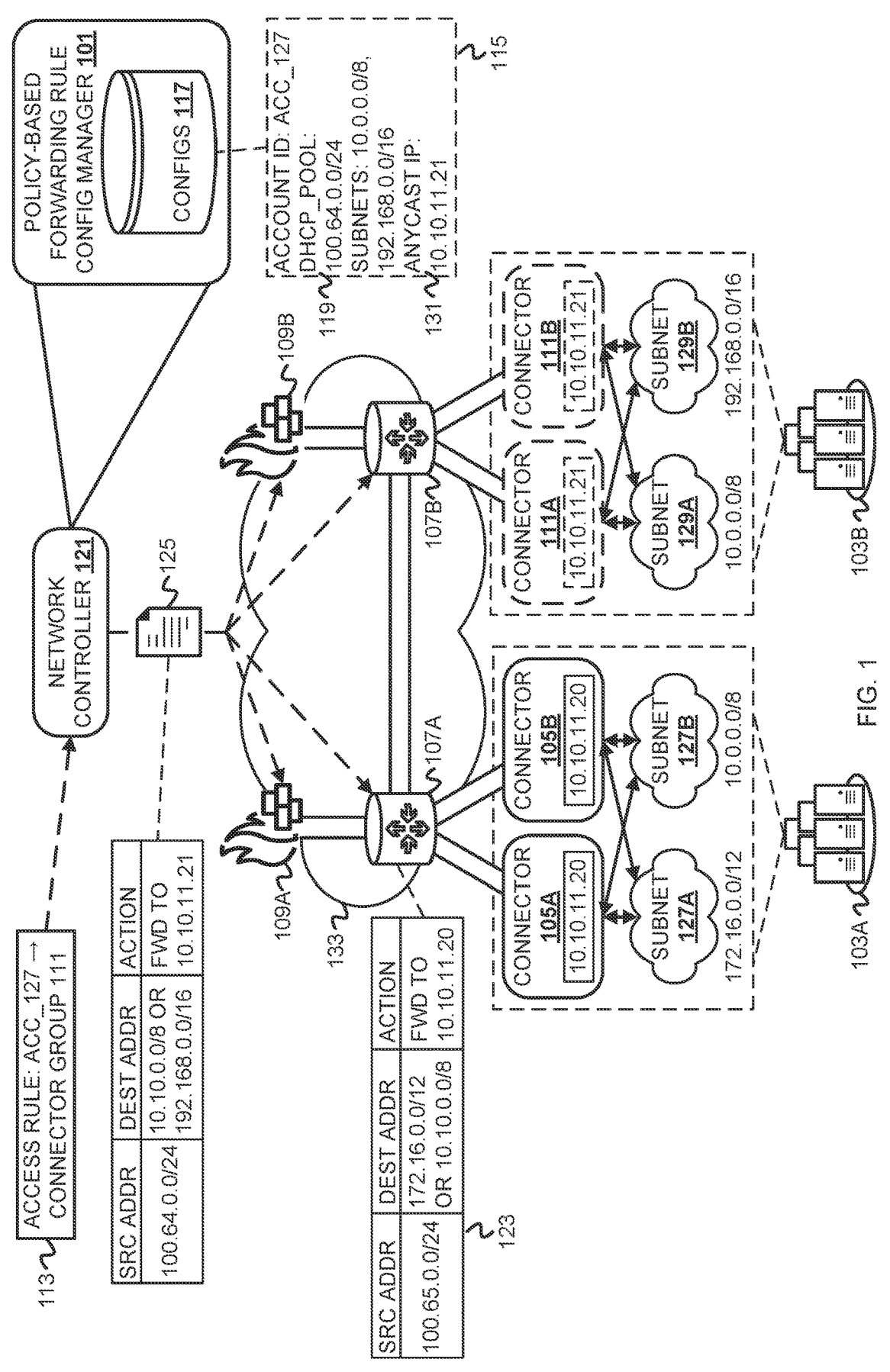
FIG. 1 is a conceptual diagram of utilizing anycast addressing and configuring policy-based forwarding rules for deploying resources within different accounts of a tenant.

The description that follows includes example systems, methods, techniques, and program flows to aid in understanding the disclosure and not to limit claim scope. Well-known instruction instances, protocols, structures, and techniques have not been shown in detail for conciseness.

2

Terminology

This description uses the term "connector" to refer to a network element deployed in a network to front a resource (e.g., an application or subnet). The connector "fronts" a resource by providing access to the resource (e.g., an instance of the application or to the subnet) without publicizing a network address assigned to the resource. Fronting a resource is also referred to herein as proxying or being a proxy for a resource.

The description refers to a "network controller." This term refers to a device programmed and configured to provide instructions/commands for network management and/or orchestrating network functions, or to a program(s) that generates instructions/commands for network management and/or orchestrating network functions when the program(s) is executed.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

Tenants of a security provider may have multiple accounts associated therewith, where each account has its own resources (e.g., subnets and/or applications), such as in the case where a tenant is an organization that has multiple customers with their own corresponding accounts. Because the resource(s) associated with each account are logically distinct, resources associated with different accounts may be defined with an overlapping IP address. This creates a challenge for the tenant in distinguishing resources with an overlapping IP address that correspond to different accounts from a networking perspective. In other words, when network traffic indicates a destination address corresponding to the overlapping IP address, conventional routing based on destination addresses is unable to distinguish the intended destination.

To resolve this, anycast IP addressing and policy-based forwarding are implemented so that resources deployed in association with different accounts but have overlapping IP addresses appear to the tenant as distinct. When an account (e.g., a customer account) is created and the associated resources are onboarded to the tenant's account for deployment to a data center of the tenant's network, the disclosed service that executes on a network controller configures a Dynamic Host Configuration Protocol (DHCP) address pool for the account. The IP addresses within the DHCP address pool that are allocated to endpoint devices in association with the account (e.g., based on establishing network connections to access resources of the account) are unique with respect to IP addresses in DHCP address pools configured for other accounts such that DHCP address pools are non-overlapping across accounts. One or more connectors are also configured (e.g., by a network administrator) to front the resources in the data center and are allocated an anycast IP address by the service. The anycast IP address allocated to the connector(s) is also unique with respect to anycast IP addresses allocated to any other connectors fronting other resources associated with the same account or different accounts. The service then creates a policy-based forwarding rule to forward network traffic originating from an IP address within the account's DHCP address pool with a destination address that matches an IP address of the resource(s) to the anycast IP address allocated to the connector(s) that fronts the resources. The policy-based forwarding rule comprises source and destination IP address matching criteria, where network traffic that matches these criteria are to be forwarded to the anycast IP address specified by the rule. The service configures network elements of the network fabric with the policy-based forwarding rule to facilitate "stitching" of a route to the resources via the anycast IP address in the network fabric. As a result, even if network traffic indicates an overlapping IP address as a destination IP address, the network traffic can be forwarded to the correct destination as can be distinguished via anycast IP addressing based on the combination of the source and destination IP addresses.

Example Illustrations

FIG. 1 is a conceptual diagram of utilizing anycast addressing and configuring policy-based forwarding rules for deploying resources within different accounts of a tenant. FIG. 1 depicts a policy-based forwarding rule configuration manager 101 (hereinafter the "configuration manager 101") and a network fabric 133. The configuration manager 101 executes as part of a network controller 121 (e.g., a cloud-based network controller) that can communicate with network elements of the network fabric 133. As an illustrative example, the network controller 121 may be a software-defined wide area network (SD-WAN) controller. The configuration manager 101 and network elements of the network fabric 133 have various capabilities to onboard connectors and resources and to create routes through the network fabric 133 to extend the network fabric 133 into tenant networks.

In this example, the network fabric 133 includes secure gateways 109A-B and routers 107A-B, each of which is programmed with load balancing functionality. The secure gateways 109A-B manage access of users to tenant resources through enforcement of security policies. The secure gateways 109A-B can comprise firewalls or secure web gateways, for example. Users of the tenant can connect to one of the secure gateways 109A-B to access tenant resources. The routers 107A-B can be configured to serve different regional data centers. Respective tunnels (e.g., Internet Protocol security (IPsec) tunnels) are established between the secure gateway 109A and the router 107A, between the secure gateway 109B and the router 107B, and between the routers 107A-B.

Tenant resources that are exposed to (i.e., made accessible via) the network fabric 133 can correspond to different accounts associated with the tenant and thus should be distinct from a routing perspective. Accounts associated with the tenant may correspond to different customers of the tenant, for example. The configuration manager 101 maintains or has access to a database 117 that stores account configurations. Account configurations maintained in the database 117 comprise configuration data/metadata of accounts that are created and for which resources are onboarded in the network fabric 133. Onboarding resources in the network fabric 133 refers to configuring reachability of resources via the network fabric 133, which includes configuring forwarding rules on the secure gateways 109A-B and the routers 107A-B.

This example assumes that resources associated with a first account are already deployed in a data center 103A and accessible via the network fabric 133, where the data center

103A is a data center with which the first account is associated (e.g., located in a region in which an entity(ies) associated with the first account is located or most proximal to the entity(ies) associated with the first account). In particular, a subnet 127A configured with network prefix 172.16.0.0/12 and a subnet 127B configured with network prefix 10.0.0.0/8 are deployed to the data center 103A. The subnets 127A-B are fronted by connectors 105A-B instantiated in the data center 103A, and the router 107A has established respective tunnels to each of the connectors 105A-B. The configuration manager 101 has assigned an anycast IP address 10.10.11.20 to the connectors 105A-B from routable address space of the network fabric 133. The connectors 105A-B thus advertise the anycast IP address 10.10.11.20 to elements of the network fabric 133 rather than the IP addresses of the subnets 127A-B themselves. The router 107A forwards network traffic destined for the subnets 127A-B to the connectors 105A-B via the anycast IP address 10.10.11.20 based on both source and destination IP addresses of the network traffic according to a policy-based forwarding rule 123 (hereinafter "the rule 123"). The configuration manager 101 has previously created the rule 123 and configured network elements of the network fabric 133 with the rule 123. FIG. 1 depicts the router 107A as being configured with the rule 123 for simplicity, but other network of the network fabric 133 depicted in this example should also be configured with the rule 123. The router 107A can load balance the network traffic across the connectors 105A-B (e.g., via equal cost multi-path routing (ECMP)).

Onboarding of resources associated with another account, which has an example identifier "ACC_127", is now described. The configuration manager 101 detects creation of the account "ACC_127", such as based on receipt of a notification and/or account configuration (e.g., configuration data, a configuration file, etc.) that comprises the account identifier "ACC_127". Account creation may be performed by a network administrator or other individual with admin privileges associated with the tenant. The configuration manager 101 configures a DHCP pool 119 for the account. The DHCP pool 119 comprises IP addresses in routable address space of the network fabric 133 that are to be allocated via DHCP to endpoint devices associated with the account. The configuration manager 101 may configure the DHCP pool 119 on a DHCP server of the tenant (not depicted in FIG. 1). This example depicts the DHCP pool 119 as including the IP addresses within the network prefix 100.64.0.0/24. The configuration manager 101 creates the DHCP pool 119 with IP addresses that are unique with respect to other DHCP pools configured for other accounts, which includes the DHCP pool assumed to be configured for the first account described above. The DHCP pool 119 is also configured with IP addresses that are non-overlapping with respect to other IP addresses within the network fabric 133, such as the IP addresses associated with the secure gateways 109A-B and routers 107A-B. The configuration manager 101 updates the database 117 with an account configuration 115 that comprises the account identifier "ACC_127" and indicates the addresses within the DHCP pool 119 configured for the account.

The configuration manager 101 detects deployment of subnets 129A-B associated with the account "ACC_127" to a data center 103B. The data center 103B is a data center with which the account "ACC_127" is associated and may be in a different region than the data center 103A. Deployment of the subnets 129A-B may be initiated by a network administrator or other entity that manages deployment of tenant resources, for instance. The configuration manager

101 may receive configuration data identifying the subnets 129A-B, the data center 103B, and network prefixes of the subnets 129A-B, which are 10.0.0.0/8 and 192.168.0.0/16 in this example. As can also be seen in FIG. 1, the subnet 127B and the subnet 129B comprise overlapping IP addresses, or 10.0.0.0/8, that were defined for different respective accounts. The configuration manager 101 also obtains a configuration of connectors 111A-B that are to be instantiated in the data center 103B to front the subnets 129A-B. The configuration of the connectors 111A-B may be obtained with the configuration of the subnets 129A-B and can comprise an identifier of the connectors 111A-B defined for the account (e.g., "connector group 111").

The configuration manager 101 orchestrates instantiation of the connectors 111A-B in the data center 103B, which establish respective tunnels to the router 107B. The configuration manager 101 assigns an anycast IP address 131, depicted as the IP address 10.10.11.21, to the connectors 111A-B. The configuration manager 101 assigns the anycast IP address 131 to the connectors 111A-B from routable address space of the network fabric 133 such that the anycast IP address 131 differs from anycast IP addresses assigned to other connectors instantiated for the tenant across accounts. To illustrate, the configuration manager 101 has assigned different respective anycast IP addresses to the connectors 105A-B and connectors 111A-B. The configuration manager 101 updates the account configuration 115 with the network prefixes of the subnets 129A-B and the anycast IP address 131. While depicted as part of a same configuration maintained in the database 117, in implementations, account configurations and resource configurations associated with respective accounts may be maintained in separate databases or data structures. To illustrate, the configuration manager 101 can maintain account configurations comprising account identifiers and DHCP pools in a first data store and resource configurations comprising resource identifiers, IP addresses, anycast IP address of the connector(s) that front the resource, and respective account identifier in a second data store.

The configuration manager 101 obtains an access rule 113 that is configured (e.g., by a network administrator) for the account once the subnets 129A-B are deployed and the connectors 111A-B have been configured to front the subnets 129A-B. The access rule 113 is a high level rule that is defined by the tenant to allow forwarding of network traffic of the account to the connectors 111A-B, referred to in FIG. 1 as "connector group 111." Obtaining the access rule 113 triggers creation of a policy-based forwarding rule 125 (hereinafter "the rule 125") for the subnets 129A-B. Access rules thus serve as more easily understood and defined representations of policy-based forwarding rules from the end user's perspective, and the configuration manager 101 derives policy-based forwarding rules from access rules.

Policy-based forwarding rules that the configuration manager 101 creates, including the rule 125 and the rule 123 described above, at least indicate a source address criterion, a destination address criterion, and a forwarding destination. For instance, the configuration manager 101 can create policy-based forwarding rules according to a template. The configuration manager 101 incorporates IP addresses identified from the account configuration 115 into this template to create the rule 125. In particular, the configuration manager 101 incorporates the DHCP pool 119 addresses in the source address criterion of the rule 125, incorporates the IP addresses of the subnets 129A-B in the destination address criterion of the rule 125, and the anycast IP address 131 in the forwarding destination of the rule 125. The rule 125 as a result indicates that network traffic indicating a source address within the DHCP pool 119 and a destination address corresponding to one of the subnets 129A-B should be forwarded to the anycast IP address 131.

The configuration manager 101 configures network elements of the network fabric 133 with the rule 125. The configuration manager 101 pushes the rule 125 to the secure gateways 109A-B and the routers 107A-B (e.g., via respective secure connections established therebetween). The secure gateways 109A-B and the routers 107A-B then install the rule 125 to enable policy-based forwarding of network traffic that matches to the rule 125. In particular, network traffic indicating a source IP address within the DHCP pool 119 and a destination IP address corresponding to the subnets 129A-B will be forwarded towards the anycast IP address 131 assigned to the connectors 111A-B. As a result, while network traffic destined for either the subnet 127B or the subnet 129B may indicate an overlapping IP address, the correct destination for the network traffic can be discerned by the source IP address, and the secure gateways 109A-B and routers 107A-B will forward network traffic to this correct destination (with load balancing via ECMP when applicable) via the respective anycast IP address. This is illustrated by the rule 123 and the rule 125, which indicate overlapping IP addresses in the destination address criterion but different IP addresses in the source address criterion and thus different corresponding forwarding destinations.

While not depicted in FIG. 1 for simplicity, the connectors 105A-B and connectors 111A-B will "discover" the respective ones of the subnets 127A-B and 129A-B once the subnets 127A-B, 129A-B have been deployed (e.g., via probing of the respective private IP addresses that have been configured to be fronted by the respective connector). The connectors 105A-B will then advertise reachability of resources deployed to the data center 103A via the anycast IP address 10.10.11.20, and the connectors 111A-B will advertise reachability of resources deployed to the data center 103B via the anycast IP address 131 (i.e., 10.10.11.21) through Border Gateway Protocol (BGP) route advertisement.

While FIG. 1 depicts an example in which resources for different accounts are hosted in individual respective data centers, in implementations, resources associated with an account can also be hosted in multiple data centers. To illustrate, while not depicted in FIG. 1, additional resources associated with the account may be deployed in an additional data center (i.e., one in addition to the data centers 103A-B) and fronted by additional connectors instantiated in that data center. In this case, the configuration manager 101 will allocate a new anycast IP address to the additional connectors instantiated in this data center and will configure a policy-based forwarding rule for these resources that indicates the new anycast IP address. Access rules configured in such implementations may indicate the account and resource(s) as well as the connector(s). To illustrate, with reference to FIG. 1, assuming an example where the subnets 129A-B are deployed in different data centers and thus are fronted by different connectors having different respective IP addresses, an access rule for the subnet 129A may indicate the account "ACC_127", subnet 129A (e.g., by a subnet identifier), and a first anycast address, and an access rule for the subnet 129B may indicate the account "ACC_127", subnet 129B, and a second anycast IP address.

FIGS. 2-3 are flowcharts of example operations for anycast addressing and policy-based forwarding rule configuration for multi-account configurations of a tenant. The example operations are described with reference to forwarding rule configuration manager (hereinafter simply "the configuration manager") for consistency with FIG. 1 and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 2 is a flowchart of example operations for onboarding resources associated with a tenant account in a network fabric that uses anycast IP addressing and policy-based forwarding rules. The example operations assume that a tenant has access to one or more data centers (e.g., regional data centers) to which resources associated with various accounts can be deployed and made accessible via a network fabric.

At block 201, the configuration manager detects creation of an account. Multiple different accounts may be created for the tenant, such as accounts that correspond to different customers and/or projects. The configuration manager obtains an identifier of the account, such as an account name.

At block 203, the configuration manager configures an IP address pool for the account. The configuration manager allocates a pool of IP addresses to the account from routable address space of the network fabric. For instance, the configuration manager can configure a DHCP address pool that comprises DHCP addresses that will be assigned to endpoint devices associated with the account (e.g., signed into the account) when establishing a network connection to access resources of the account. The configuration manager may configure a DHCP server with the IP address pool for the account and may also store an indication of the IP addresses in the address pool in association with an indication of the account. IP addresses with which the address pool is configured should be unique with respect to other IP addresses allocated to the tenant, including with respect to other configured IP address pools. In other words, IP addresses with which IP address pools are configured should be non-overlapping across accounts.

At block 205, the configuration manager detects indication of deployment of one or more resources in association with the account. The configuration manager can detect configuration of the resource(s) based on obtaining configuration data (e.g., in a configuration file) of the resource(s). The configuration data identify the account and comprise one or more network addresses (e.g., IP addresses) of the resource(s) to be onboarded in the network fabric, such as network prefixes of subnets being onboarded. The configuration also should indicate a data center of the tenant and one or more connectors that are to front the resource(s) in the data center. For instance, the configuration data can indicate a quantity of connectors that should be instantiated in the data center to front the resources and an identifier of the connector(s).

At block 207, the configuration manager orchestrates instantiation of one or more connectors to front the resource(s). The configuration manager orchestrates instantiation of the connector(s) in the data center indicated for deployment of the resources. The connectors that are instantiated can be hardware or software elements instantiated in the data center.

At block 209, the configuration manager assigns an anycast IP address to the connector(s). The configuration manager allocates an anycast IP address from routable address space of the network fabric (e.g., from an IP address aggregate) for assignment to the connector(s) instantiated in the data center. The connector(s) thus expose the resource(s) to elements of the network fabric via the anycast IP address. The anycast IP address assigned to the connector(s) should be unique (i.e., non-overlapping) with respect to other anycast IP addresses assigned to connectors instantiated for the tenant.

At block 211, the configuration manager detects configuration of an access rule that indicates the resource(s) and the connector(s). The configuration manager obtains (e.g., via user input, such as from a network administrator) an access rule that allows network traffic destined for the resource(s) to be forwarded to the connector(s). The access rule may indicate the resource(s) and/or account as a source and the connector(s) as a destination, such as via their respective identifiers.

At block 213, the configuration manager configures network elements of the network fabric with a policy-based forwarding rule for the resource(s). The configuration manager can push a policy-based forwarding rule created for the resource(s) to each network element of the network fabric (e.g., each overlay network element, such as secure gateways, routers, etc.), such as via a secure communication connection established therebetween. The policy-based forwarding rule is a rule to forward network traffic that comprises a source IP address within the IP address pool configured for the account and a destination IP address of the resource(s) to the anycast IP address allocated to the connector(s) that fronts the resource(s). Creation of policy-based forwarding rules is described in further detail in reference to FIG. 3.

FIG. 3 is a flowchart of example operations for configuring a policy-based forwarding rule for one or more resources associated with an account. The example operations can implement block 213 of FIG. 2. For instance, configuration of a policy-based forwarding rule can be triggered by obtaining a rule that indicates the account and/or resource(s) and a connector(s) that fronts the resource(s), such as a rule that allows traffic destined for the resource(s) to be forwarded to the connector(s). The example operations assume that the configuration manager has access to a configuration of the account and the resource(s) for which the policy-based forwarding rule is being configured.

At block 301, the configuration manager determines IP addresses in an address pool configured for the account. The address pool can be a DHCP address pool that was configured for the account. The address pool may be represented as an IP address aggregate, as a range of IP addresses, etc.

At block 303, the configuration manager determines an IP address(es) of the resource(s) from the resource configuration. The IP address(es) may be a single IP address or a group of IP addresses, such as an IP address aggregate. For instance, the resource may be a subnet, where the configuration of the subnet indicates an IP address aggregate (e.g., a Classless Inter-Domain Routing (CIDR) block) with which the subnet was configured.

At block 305, the configuration manager determines an anycast IP address assigned to the connector(s) that fronts the resource(s). The anycast IP address was previously assigned to the connector(s) and is a non-overlapping IP address with respect to other connectors having anycast IP addresses assigned thereto, such as those instantiated in association with other accounts.

At block 307, the configuration manager creates a policy-based forwarding rule that indicates the IP address pool addresses as a source address criterion, the resource(s) IP address(es) as a destination address criterion, and the anycast IP address as the forwarding destination. The configuration manager can create the policy-based forwarding rule according to a rule template into which the configuration manager incorporates the IP addresses determined at blocks 301, 303, and 305. The policy-based forwarding rule is implemented to forward network traffic that indicates a source address having a match in the IP address pool and a destination address that matches the resource(s) towards the anycast IP address. The policy-based forwarding rule may indicate other criteria, such as a route next hop.

At block 309, the configuration manager pushes the policy-based forwarding rule to network elements of the network fabric. The configuration manager can communicate with network elements of the network fabric, such as routers, secure gateways, etc., because the configuration manager executes as part of a network controller. The network elements then will install the policy-based forwarding rule so that network traffic that matches the rule will be forwarded to the anycast IP address.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 4:
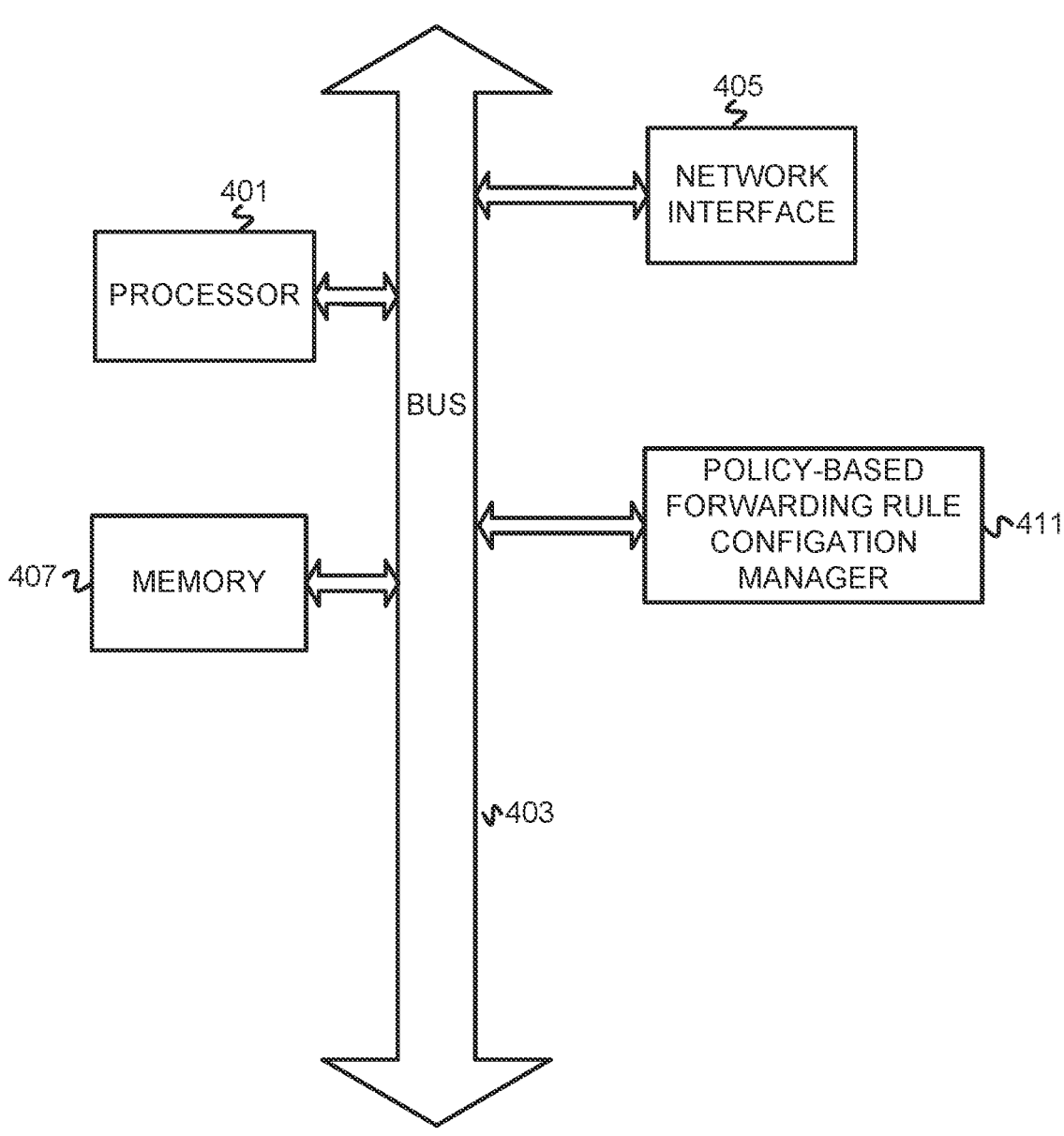
FIG. 4 depicts an example computer system with a policy-based forwarding rule configuration manager.

FIG. 4 depicts an example computer system with a policy-based forwarding rule configuration manager. The computer system includes a processor 401 (possibly including multiple processors, multiple cores, multiple nodes, and/or implementing multi-threading, etc.). The computer system includes memory 407. The memory 407 may be system memory or any one or more of the above already described possible realizations of machine-readable media. The computer system also includes a bus 403 and a network interface 405. The system also includes policy-based forwarding rule configuration manager 411. The policy-based forwarding rule configuration manager 411 configures policy-based forwarding rules that utilize anycast IP addressing for resources associated with multiple accounts of a tenant. Any one of the previously described functionalities may be partially (or entirely) implemented in hardware and/or on the processor 401. For example, the functionality may be implemented with an application specific integrated circuit, in logic implemented in the processor 401, in a co-processor on a peripheral device or card, etc. Further, realizations may include fewer or additional components not illustrated in FIG. 4 (e.g., video cards, audio cards, additional network interfaces, peripheral devices, etc.). The processor 401 and the network interface 405 are coupled to the bus 403. Although illustrated as being coupled to the bus 403, the memory 407 may be coupled to the processor 401.

The invention claimed is:

1. A method comprising:
based on indication of deployment of a first set of one or more resources for a first account in a first data center, configuring a first Internet Protocol (IP) address pool for the first account from routable address space of a network fabric;
allocating a first anycast IP address for the first account from the routable address space of the network fabric;
creating a first policy-based forwarding rule to forward network traffic that indicates a source IP address within the first IP address pool and a destination IP address corresponding to any of the first set of resources to the first anycast IP address; and
configuring one or more network elements of the network fabric with the first policy-based forwarding rule.

2. The method of claim 1, wherein creating the first policy-based forwarding rule comprises determining first IP addresses in the first IP address pool and determining second IP addresses corresponding to the first set of resources based on a configuration defined for the first account, wherein the first policy-based forwarding rule indicates the first IP addresses in a source IP address matching criterion and indicates the second IP addresses in a destination IP address matching criterion.

3. The method of claim 1, further comprising instantiating one or more connectors for the first account to front the first set of resources in the first data center, wherein allocating the first anycast IP address for the first account comprises assigning the first anycast IP address to the one or more connectors.

4. The method of claim 3, wherein instantiating the one or more connectors is based on detecting configuration of a forwarding rule that allows forwarding of network traffic associated with the first account to the one or more connectors.

5. The method of claim 1, further comprising:
   based on indication of deployment of a second set of one or more resources of a second account, configuring a second IP address pool for the second account;
   allocating a second anycast IP address to the second account from the routable address space of the network fabric, wherein the second anycast IP address is different than the first anycast IP address;
   creating a second policy-based forwarding rule to forward network traffic that indicates a source IP address within the second IP address pool and a destination IP address corresponding to any of the second set of resources to the second anycast IP address; and
   configuring the one or more network elements of the network fabric with the second policy-based forwarding rule.

6. The method of claim 5, wherein the first and second policy-based forwarding rules indicate an overlapping IP address assigned to corresponding ones of the first and second sets of resources.

7. The method of claim 5, wherein the first and second accounts correspond to respective first and second customers of a tenant.

8. The method of claim 1, wherein configuring the first IP address pool for the first account comprises configuring a Dynamic Host Configuration Protocol (DHCP) address pool.

9. The method of claim 1, further comprising:
   based on indication of deployment of a third set of one or more resources for the first account in a second data center, allocating a third anycast IP address for the first account, wherein the third anycast IP address differs from the first anycast IP address;
   creating a third policy-based forwarding rule to forward network traffic that indicates a source IP address within the first IP address pool and a destination IP address corresponding to any of the third set of resources to the third anycast IP address; and
   configuring the one or more network elements of the network fabric with the third policy-based forwarding rule.

10. The method of claim 9, further comprising instantiating one or more additional connectors for the first account to front the third set of resources in the second data center, wherein allocating the third anycast IP address for the first account comprises assigning the third anycast IP address to the one or more additional connectors.

11. One or more non-transitory machine-readable media having program code stored thereon, the program code comprising instructions to:
   based on indication of deployment of one or more resources for an account in a data center, configure an Internet Protocol (IP) address pool for the account from routable address space of a network fabric;
   allocate an anycast IP address for the account from the routable address space of the network fabric;
   create a policy-based forwarding rule to forward network traffic indicating a source IP address within the IP address pool and a destination IP address corresponding to the one or more resources to the anycast IP address; and
   configure one or more network elements of the network fabric with the policy-based forwarding rule.

12. The non-transitory machine-readable media of claim 11, wherein the instructions to create the policy-based forwarding rule comprise instructions to create the policy-based forwarding rule with a source IP address criterion that indicates IP addresses in the IP address pool and with a destination IP address criterion that indicates one or more IP addresses of the one or more resources.

13. The non-transitory machine-readable media of claim 11, wherein the program code further comprises instructions to instantiate one or more connectors for the account to front the one or more resources in the data center, wherein the instructions to allocate the anycast IP address for the account comprise instructions to assign the anycast IP address to the one or more connectors.

14. The non-transitory machine-readable media of claim 11, wherein the instructions to configure the IP address pool for the account comprise instructions to configure a Dynamic Host Configuration Protocol (DHCP) address pool.

15. An apparatus comprising:
   a processor; and
   a machine-readable medium having instructions stored thereon that are executable by the processor to cause the apparatus to,
      based on indication of deployment of a first resource for a first account in a first data center, configure a first Internet Protocol (IP) address pool for the first account from routable address space of a network fabric;
      allocate a first anycast IP address for the first account from the routable address space of the network fabric;
      create a first policy-based forwarding rule, wherein the first policy-based forwarding rule is a rule to forward network traffic that indicates a source IP address within the first IP address pool and a destination IP address corresponding to the first resource to the first anycast IP address; and
      configure one or more elements of the network fabric with the first policy-based forwarding rule.

16. The apparatus of claim 15, wherein the instructions executable by the processor to cause the apparatus to create the first policy-based forwarding rule comprise instructions executable by the processor to cause the apparatus to create the first policy-based forwarding rule with IP addresses in the first IP address pool in a source IP address matching criterion and with an IP address of the first resource in a destination IP address matching criterion.

17. The apparatus of claim 15, further comprising instructions executable by the processor to cause the apparatus to instantiate one or more connectors for the first account to front the first resource in the first data center, wherein the instructions executable by the processor to cause the apparatus to allocate the first anycast IP address for the first account comprise instructions executable by the processor to cause the apparatus to assign the first anycast IP address to the one or more connectors.

18. The apparatus of claim 17, wherein the instructions executable by the processor to cause the apparatus to instantiate the one or more connectors comprise instructions executable by the processor to cause the apparatus to instantiate the one or more connectors based on detecting configuration of a forwarding rule that allows forwarding of network traffic associated with the first account to the one or more connectors.

19. The apparatus of claim 15, further comprising instructions executable by the processor to cause the apparatus to:

based on indication of deployment of a second resource of a second account, configure a second IP address pool for the second account;

allocate a second anycast IP address to the second account from the routable address space of the network fabric, wherein the second anycast IP address is different than the first anycast IP address; and configure the one or more elements of the network fabric with a second policy-based forwarding rule, wherein the second policy-based forwarding rule is a rule to forward network traffic that indicates a source IP address within the second IP address pool and a destination IP address corresponding to the second resource to the second anycast IP address.

20. The apparatus of claim 15, wherein the instructions executable by the processor to cause the apparatus to configure the first IP address pool for the first account comprise instructions executable by the processor to cause the apparatus to configure a Dynamic Host Configuration Protocol (DHCP) address pool.

* * * * *